United States Patent
Bryan

(10) Patent No.: US 6,211,991 B1
(45) Date of Patent: *Apr. 3, 2001

(54) MODULATOR MANUFACTURING PROCESS AND DEVICE

(75) Inventor: Michael A. Bryan, Los Gatos, CA (US)

(73) Assignee: Photon Dynamics, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/098,192

(22) Filed: Jun. 16, 1998

(51) Int. Cl.[7] .............................. G02F 1/03; B44C 1/165
(52) U.S. Cl. ..................... 359/254; 359/245; 359/253; 156/99; 156/230; 156/239; 156/247; 156/249
(58) Field of Search ........................ 349/187, 191, 349/192; 359/245, 253, 251, 254, 257; 156/99, 230, 239, 247, 249

(56) References Cited

U.S. PATENT DOCUMENTS

| | | | |
|---|---|---|---|
| H868 | * 1/1991 | Daly ....................... | 359/257 |
| 2,467,325 | * 4/1949 | Mason ..................... | 359/254 |
| 4,802,741 | * 2/1989 | Kaukeinen ............... | 359/354 |
| 4,854,678 | * 8/1989 | Kitano et al. ............. | 359/254 |
| 4,993,811 | * 2/1991 | Blazey et al. ............. | 359/254 |
| 5,083,221 | * 1/1992 | Toyoda et al. ............ | 359/245 |
| 5,122,852 | 6/1992 | Chan et al. .............. | 357/30 |
| 5,144,471 | * 9/1992 | Takanashi et al. ........ | 359/245 |
| 5,459,410 | 10/1995 | Henley ................... | 324/770 |
| 5,517,348 | * 5/1996 | Lebby ..................... | 359/254 |
| 5,528,414 | * 6/1996 | Oakley .................... | 359/257 |
| 5,631,107 | 5/1997 | Tarumi et al. ........... | 430/1 |
| 5,724,110 | * 3/1998 | Majima .................... | 349/86 |
| 5,825,526 | * 10/1998 | Bommarito et al. ...... | 359/265 |
| 5,858,624 | 1/1999 | Chou et al. ............. | 430/371 |
| 5,897,727 | 4/1999 | Staral et al. ........... | 156/99 |
| 6,151,153 | * 11/2000 | Bryan ..................... | 359/245 |

FOREIGN PATENT DOCUMENTS

| | | |
|---|---|---|
| 403168613 | 7/1991 | (JP) . |
| 3-224782 | * 10/1991 | (JP) . |
| 406011675 | 1/1994 | (JP) . |
| 8-278491 | * 10/1996 | (JP) . |
| 409178933 | 7/1997 | (JP) . |

* cited by examiner

Primary Examiner—Georgia Epps
Assistant Examiner—Evelyn A. Lester
(74) Attorney, Agent, or Firm—Townsend and Townsend and Crew, LLP

(57) ABSTRACT

An improved method and resulting device 10 for fabricating an electro-optical modulator material. The technique includes providing a substrate 509, which has a top surface. A first layer of electrode material 501 is defined overlying the top surface. The method also includes applying a transfer sheet 400, having an electro-optical material 405, to the first layer of electrode material 501, where the electro-optical material is affixed to the first layer of electrode material. A step of removing (e.g., peeling) 801 the transfer sheet from the electro-optical material is included. The removing step leaves a substantial portion of the electro-optical modulator material intact and affixed to the first layer of electrode material. This method generally uses less steps and provides a higher quality element than pre-existing techniques.

52 Claims, 10 Drawing Sheets

MODULATOR MANUFACTURING PROCESS AND DEVICE

CROSS-REFERENCE TO RELATED APPLICATIONS

This present application is generally related to U.S. application Ser. No. 09/098,193, now U.S. Pat. No. 6,151,153 filed on the same date as this present application, commonly assigned, and hereby incorporated by reference for all purposes.

BACKGROUND OF THE INVENTION

This present invention relates to techniques for fabricating flat panel displays. More particularly, the invention is illustrated in an example related to the manufacture of an electro-optical element for use in, for example, inspecting flat panel displays, e.g., liquid crystal displays ("LCDs"), active matrix liquid crystal displays ("AMLCDs"), plasma displays, or the like. But it will be recognized that the invention also can be applied to the manufacture of almost any type electro-optical modulator material for a variety of applications.

The use of a flat panel display such as an active matrix liquid crystal display or the like continues to grow rapidly. For example, consumer items such as a pocket television, a notebook computer, an engineering work-station, a high-definition television, and others, use such a display. Based upon the continued demand for this display, industry has made massive capital investments in creating state-of-art manufacturing lines.

These state-of-art manufacturing lines, however, still rely in most part upon human test operators for the final test and inspection of these flat panel displays. The test operator performs a visual inspection of each display for defects in order to accept or reject the display. The quality or completeness of the inspection is dependent on the test operator, who has been trained using limited samples of displays that have defects and characterized as either pass or fail. The inspection results are highly subjective and prone to error, and cannot be used effectively and efficiently to monitor, control, and improve the quality of the various manufacturing processes.

Effective process monitoring and control of flat panel display production have been made possible through quantitative inspection methods by way of automatic inspection machines. An example of one of the first pioneering automatic inspection machines was developed by Photon Dynamics, Inc. ("PDI") in 1992, assignee of the present application. This first automatic inspection machine is pioneering, since a high quality inspection of flat panel displays could be performed using machines, rather than human test operators. This high quality inspection was performed on flat panel displays having completed thin film transistor components fabricated thereon.

The high quality inspection performed by machines occurs, in part, by way of conventional electro-optical elements. The electro-optical element is placed adjacent to, for example, an active matrix liquid crystal display substrate to be tested. When an electric field is impressed via the active matrix liquid crystal display upon the electro-optical element, optical properties of the element change. The change in optical properties is a microscopic optical change in the electro-optical element itself. Cameras read the change in the electro-optical element to identify defects in the active matrix liquid crystal display substrate being tested.

Although extremely useful, the conventional electro-optical element is generally difficult to manufacture. In particular, a relative complex sequence of manufacturing steps is generally performed to fabricate the electro-optical element. This complex sequence of steps generally causes lower yields and longer turn-around-times, which often lead to higher costs associated with manufacturing the element. Moreover, the conventional electro-optical element is extremely delicate and prone to damage, e.g., scratches, gouges. Damage to the element can occur even after the manufacturing process during use in the automated inspection process. Techniques have generally not been developed to easily repair the damaged electro-optical element. Accordingly, electro-optical elements are often replaced, which tends to further increase costs associated with the automated inspection process.

From the above, it can be seen that a technique for manufacturing or repairing electro-optical elements that is easy, cost effective, and reliable is often desirable.

SUMMARY OF THE INVENTION

According to the present invention, a technique including a method and resulting device for manufacturing electro-optical elements or modulator materials is provided. These modulator materials can be used with an inspection apparatus for displays, e.g., flat panel displays such as LCDs, AMLCDs, and plasma displays. Additionally, the modulator materials can be used to manufacture the displays themselves in other embodiments.

In a specific embodiment, the present invention provides an improved method for fabricating an electro-optical modulator assembly. The method includes providing a substrate, which has a top surface. A first layer of electrode material is defined overlying the top surface. The method also includes applying a transfer sheet, having an electro-optical material, to the first layer of electrode material, where the electro-optical material is affixed to the first layer of electrode material. A step of removing (e.g., peeling, stripping) the transfer sheet from the electro-optical material is included. The removing step leaves the electro-optical material intact and affixed to the first layer of electrode material. This method generally uses less steps and provides a higher quality element (e.g., more uniform, few defects) than pre-existing techniques.

In an alternative specific embodiment, the present invention provides an electro-optical element with improved features. The electro-optical element includes a substrate, which has an upper surface. A first electrode material is disposed (e.g., sputtering, depositing, spinning) on the upper surface. An electro-optical modulator material is defined using, for example, an adhesive material and a transfer substrate on the first electrode material. The adhesive material is generally transparent and can be applied uniformly overlying the first electrode material. By way of forming the transparent sheet over the electro-optical modulator, the electro-optic layer is not exposed and is protected from, for example, mechanical damage.

Numerous advantages are achieved by way of the present invention over pre-existing techniques. These advantages, among others, include greater planarity and uniformity of completed electro-optical elements. Additionally, the present invention provides for easier manufacturing using selected sequences of steps in preferred embodiments. Furthermore, the present invention provides for electro-optical elements having lower manufacturing costs than pre-existing techniques in most embodiments. Moreover, the electro-optical elements by way of the easier manufacturing technique can be made with higher quality than pre-existing techniques in some embodiments. These and other benefits are further described below.

The invention will be better understood by reference to the following detailed description in connection with the accompanying drawings.

DESCRIPTION OF SPECIFIC EMBODIMENTS

The present invention provides a technique including a method and apparatus for manufacturing electro-optical elements or modulator materials. These modulator materials can be used for the manufacture of an inspection apparatus for displays, e.g., flat panel displays such as LCDs, AMLCDs, and plasma displays. Additionally, the modulator materials can be used to manufacture the displays themselves.

Figure 1:
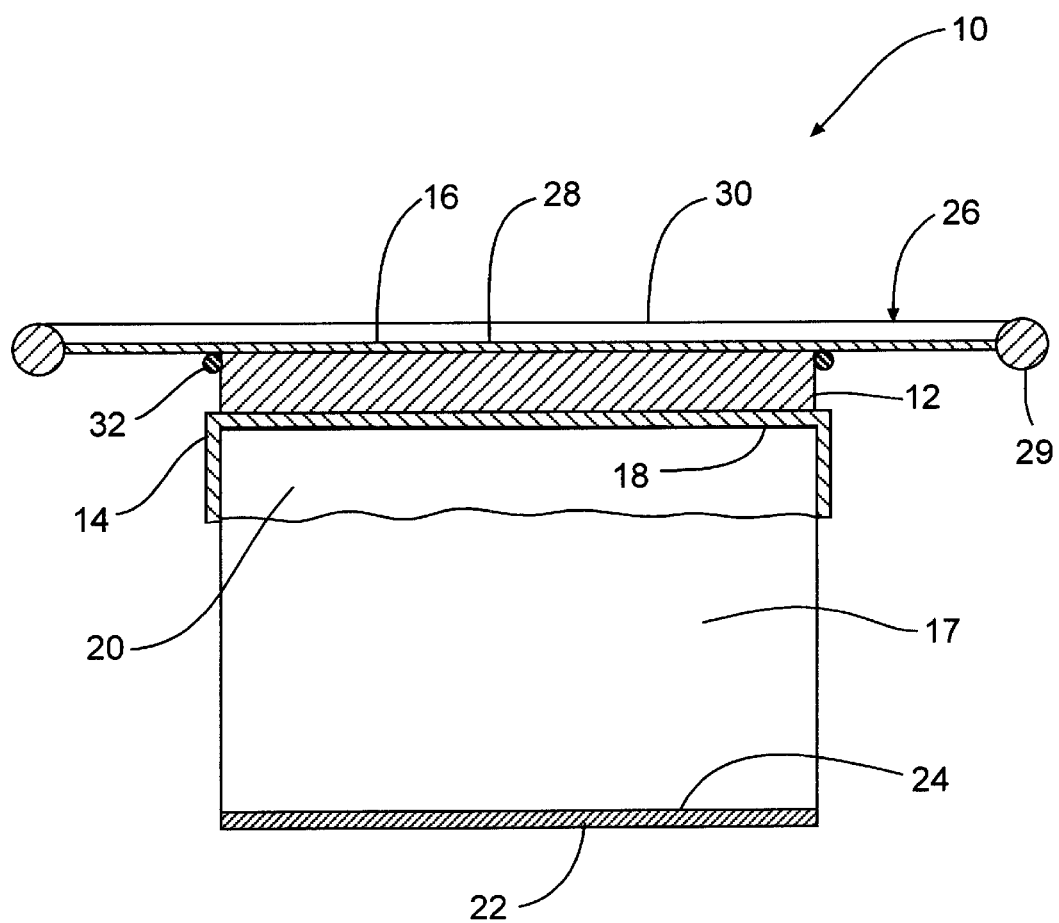
FIG. 1 is a simplified cross-sectional view diagram of an electro-optical element according to the present invention.

FIG. 1 is a simplified cross-sectional view diagram of an electro-optical element 10 according to the present invention. This diagram is merely an illustration and should not limit the scope of the claims herein. As shown, the electro-optical element 10 is an assembly of various elements and layers. These layers generally include an electro-optical modulator material 12 disposed upon transparent electrode 14. Electrode 14 is defined on a substrate 17, which is often termed a cube. Electrode 14 overlies a top surface 18 of the substrate and also overlies portions of four edges 20 of the substrate. Substrate 17 includes an anti-reflective coating 22 (e.g. a dielectric anti-reflective stack of layers) defined overlying a bottom surface 24. A pellicle assembly 26, which includes a reflective material 16, is defined overlying the modulator material 12.

The electro-optical modulator material 12 is often made of liquid crystal containing sheets called Nematic Curvilinear Aligned Phase material, commonly termed NCAP or polymer dispersed liquid crystal (PDLC). Light transmission changes in accordance with a magnitude of an electric field impressed across the liquid crystal material. Alternatively, liquid crystals in a polymer matrix or binder which appear transparent or non-transparent may be used. Alternatively, materials that can be used exploiting the Pockel's effect, in which the magnitude of polarization of reflected light changes depend upon a strength of electric field applied or impressed thereon, may also be used. Of course, the type of electro-element or modulator material used depends upon the application.

Transparent electrode 14 can be made from a variety of materials. These materials include, among others, indium tin oxide (ITO). Other types of materials that are relatively transparent and conductive can also be used. Of course, the type of material used depends upon the application.

The present electro-optical element includes an interface region, between the modulator material and the electrode, that is thinner and more planar than pre-existing structures. In particular, an interface between the electro-optical modulator material and the electrode is preferably a uniformly thin film of adhesive. Specifically, the adhesive layer should be flatter than 3 microns across the entire surface. Further the adhesive should have a thickness of less than about 0.5 microns to 1.0 microns. An example of this adhesive is an epoxy, a cyanoacrylate, a silicone based RTV, an ultraviolet light ("UV") curable epoxy. A product sold under the name of UV.10 by Master Bond can be used, but there can be others. Accordingly, the present invention provides an improved structure, which has greater quality than pre-existing techniques. The choice depends on the desired viscosity, thixotropy, and solvent like qualities desired.

The pellicle assembly 26 is generally made of a support structure 29 having a film of plastic 30 disposed thereon. The support structure 29 can be an annular ring structure such as an aluminum ring or the like. Pellicle assembly 26 provides support for the reflective layer 16 and provides protection to the electro-optical modulator material.

The plastic film can be made of a variety of materials, but is preferably Mylar. The plastic film often includes an overlying reflective layer 16. Preferably, the reflective layer is defined overlying a surface, which faces against the electro-optical modulator material. This reflective layer 16 facing the electro-optical modulator material is protected by the overlying film of plastic 30 such as mylar and the like. A thin film or bead 32 of adhesive can be applied to a periphery of the electro-optical material to seal it to reflective layer 16. Accordingly, the present pellicle assembly is more durable than those made by pre-existing techniques.

Substrate 17 includes the overlying electrode layer 14 such as indium tin oxide or the like. Electrode layer 14 is defined overlying the top surface of the substrate, which is finished, as well as portions of the side surfaces or edges, which are not finished. Preferably, ITO layer is disposed in a single continuous layer overlying the top surface and edges, but it does not cover bottom edges or the bottom of the substrate. The ITO layer can be applied to the substrate via sputtering and masking techniques, and other well known methods. The bottom of the substrate typically includes an anti-reflective layer 22. As merely an example, the substrate is a cube (or other cylindrically-shaped solid) of BK-7 glass from Tusan Optical Research Corporation ("TORC").

Although the above descriptions are described in terms of a specific embodiment, other variations, alternatives, and modifications can be used. For instance, although the electrode layer in the above embodiment is described as indium tin oxide, other materials can be used. Additionally, the substrate described is one manufactured by TORC, other substrates such as those manufactured by any of a variety of manufacturers such as Scott and others can be used. The above electro-optical element can be used in a variety of applications including, for example, the test equipment shown in the Fig. below.

Figure 2:
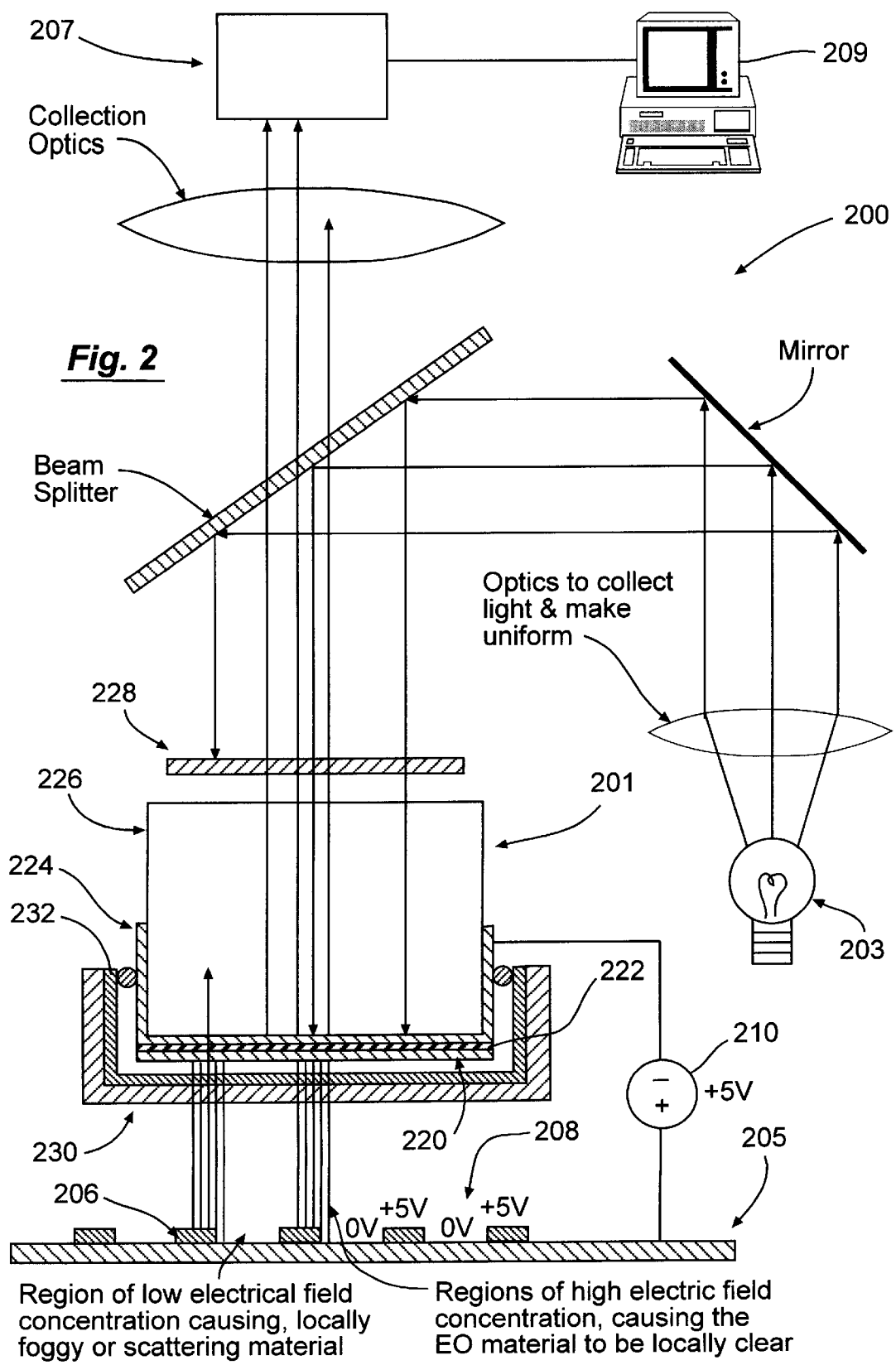
FIG. 2 is a simplified diagram of elements for test equipment using the electro-optical element according to the present invention.

FIG. 2 is a simplified diagram of main elements of test equipment 200 using the electro-optical element 201 according to the present invention. This diagram is merely an illustration and should not limit the scope of the claims herein.

As previously described electro-optical element 201 includes an electro-optical modulator material 220, an adhesive layer 222, an electrode 224, a substrate 226, an anti-reflective coating (ARC) 228, and a pellicle assembly 230. In the present embodiment, a mirror or reflective layer 232 is disposed on the inside surface of the pellicle assembly 230. In one embodiment, mirror 232 is a thin film formed using a sputtering process or evaporatively deposited and is composed of oxides such as zirconium oxide, aluminium oxide or chromium oxide. This arrangement provides enhanced durability of the mirror 232. In alternative embodiments, mirror 232 may be disposed on the outside surface of the pellicle assembly 230.

The test equipment 200 includes a light source 203 or sources, which irradiate light to a surface of, for example, an active matrix liquid crystal display 205. The active matrix liquid crystal display 205 includes pixel elements 206 disposed between inactive regions 208. A voltage 210 is applied between the active matrix liquid crystal display 205 and the electro-optical element assembly 201. Voltage 210 is typically biased with a DC offset such at the electro-optical modulator material 220 is within a "high gain" region. In other words, a DC bias is imposed such that a small additional change in voltage impressed by voltage 210 provides a large change in modulation characteristics of electro-optical modulator material 220.

In operation, light transmits through portions of the electro-optical element assembly, and defects can be detected by observing changes in the reflected or transmitted light. Thus for example, in areas where a normal pixel is located, a localized voltage potential is impressed causing the electro-optical modulator material to be locally translucent. Further in areas where no voltage potential is impressed, the electro-optical modulator material remains relative opaque. In the case where the material is locally translucent, light from light source 203 is reflected from mirror 232 and captured by camera 207. In other areas, little light is reflected.

Observing generally takes place using camera 207, such as "Thompson" brand charge coupled device ("CCD") camera or the like. A monitor 209 from a computer system coupled to an image processor is also typically included for inspection purposes. In most cases, the electro-optical element assembly is disposed against or close to the surface of the active matrix liquid crystal display to facilitate inspection. An example of this test equipment is described in U.S. Pat. No. 4,983,911, in the name of Francois J. Henley, commonly assigned, and hereby incorporated by reference for all purposes.

Figure 3:
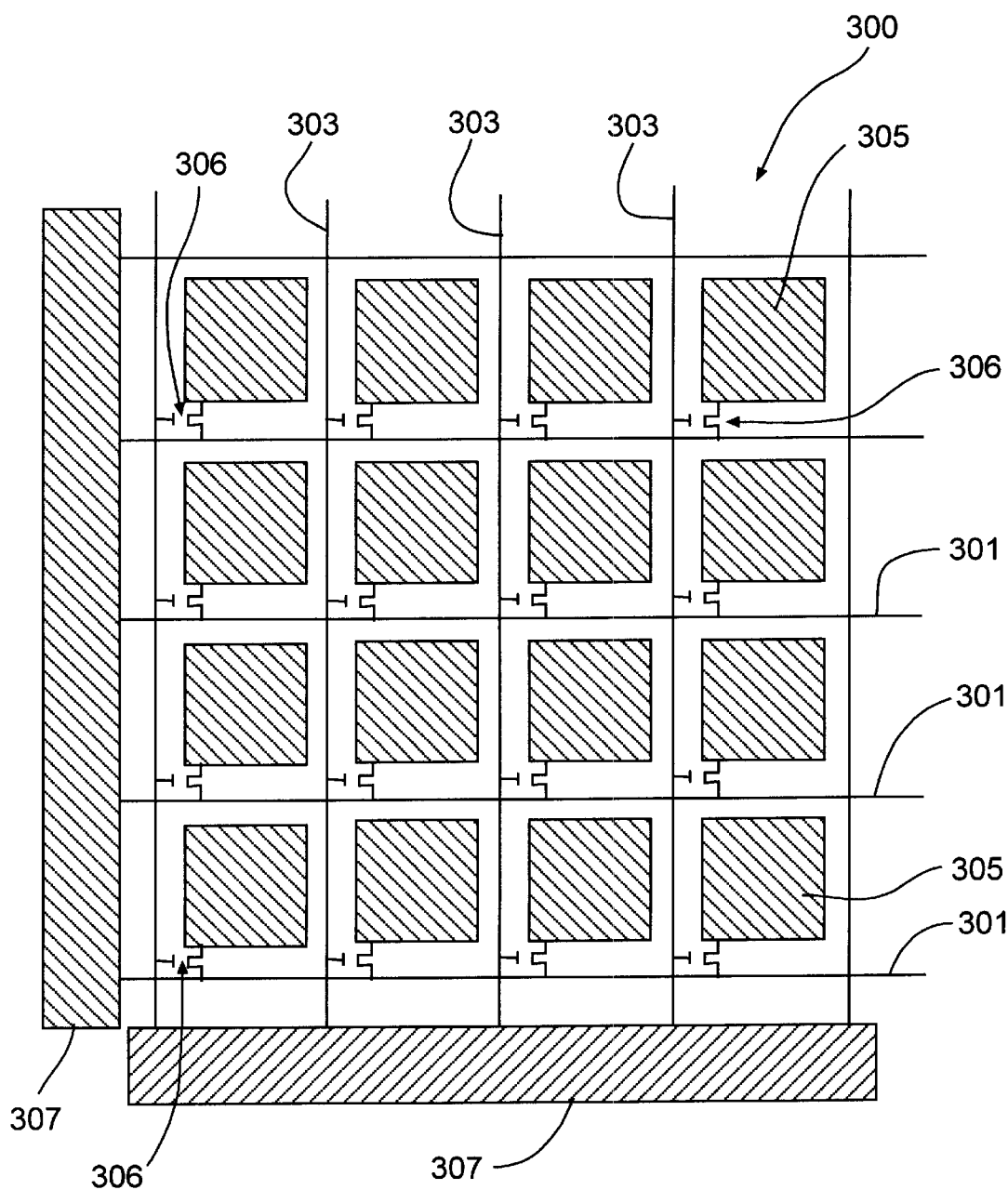
FIG. 3 is an expanded diagram of elements of an active matrix liquid crystal display substrate.

FIG. 3 is an expanded diagram of simplified elements of an active matrix liquid crystal display substrate 300, such as the one noted above. This diagram is merely an illustration and should not limit the scope of the claims herein. Active matrix liquid crystal display substrate 300 is one commonly used in liquid crystal display panels. The display 300 is constructed of several source wires 301 to generate flow of data signals, and several gate wires 303 to allow flow of scan signals formed on a substrate in an array state. Pixel element electrodes 305 are formed in between these wires, and each pixel element electrode is connected to a source wire and a gate wire via a switching element which is a thin film transistor 306. A shorting bar 307 connects to source wiring and connects to gate wiring. This shorting bar 307 is often removed after manufacturing the liquid crystal display substrate. Liquid crystals are inserted between the active matrix liquid crystal display and a transparent substrate to form the liquid crystal display panel. Of course, there are other types of displays and elements which can be observed by way of the present electro-optical modulator element.

In a specific embodiment, the invention provides a technique for manufacturing a modulator material for an electro-optical display or inspection of a flat panel display or the like using a transferring technique. The technique may be briefly outlined as follows:

1. Provide a transfer material having a layer of electro-optical modulator material formed thereon;
2. Provide a substrate having an overlying first electrode layer formed thereon;
3. Clean surface of the electrode layer on the substrate to remove any oils or particles therefrom;
4. Dispense adhesive material on the first electrode layer;
5. Place the layer of electro-optical modulator material (transfer material facing away from the substrate) on the first electrode layer overlying the substrate;
6. Cure or dry adhesive;
7. Remove the transfer material from the layer of electro-optical material while keeping the electro-optical material intact and affixed to the first electrode layer;
8. Dispose a pellicle/reflector assembly adjacent the surface of the electro-optical modulator material; and
9. Perform remaining fabrication steps, as necessary.

As shown, the technique generally provides a sequence of steps that forms an electro-optical modulator material on a substrate. The sequence of steps uses an electro-optical modulator material formed on a transfer material, which is later discarded. By way of the transfer material, the electro-optical material is easily affixed to a substrate to form the electro-optical assembly, without a possibility of damage to the electro-optical material or electrodes. The above sequence of steps is merely illustrative, and should not limit the scope of the claims herein. One of ordinary skill in the art would recognize other variations, modifications, and alternatives. Details with regard to the present invention are described throughout the present specification and more particularly in the Figs. below.

FIGS. 4–9 are simplified cross-sectional view diagrams of an electro-optical element being manufactured according to the present invention. These diagrams are merely illustrations and should not limit the scope of the claims herein.

Figure 4:
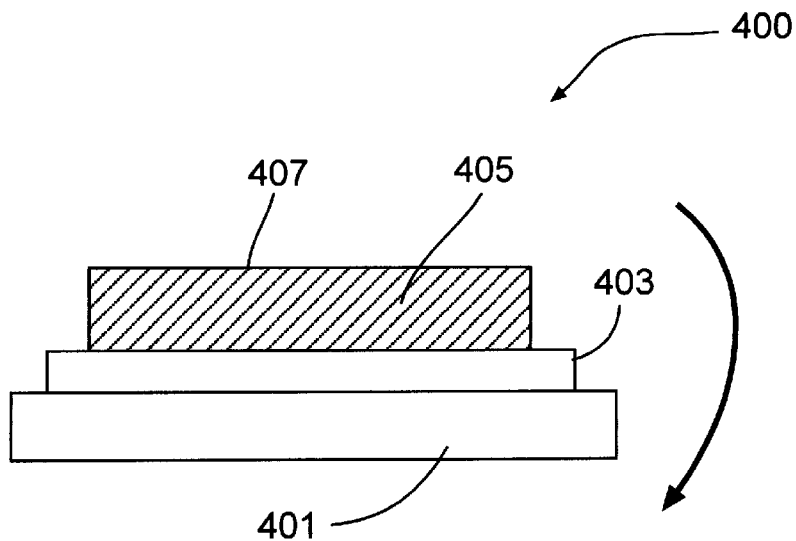
FIGS. 4–9 are simplified cross-sectional view diagrams of an electro-optical element being manufactured according to the present invention.

The process begins with a transfer assembly 400 as illustrated by FIG. 4, for example. The transfer assembly 400 includes a transfer substrate 401, an intermediary sheet 403, and a film of electro-optical modulator material 405 defined thereon. The transfer substrate 401 can be any relatively firm and rigid material capable of supporting the electro-optical modulator material. The substrate generally has a certain amount of flexibility, however. In most embodiments, the transfer substrate has a flexibility similar to a regular "business card." The substrate is also generally abrasion resistant and capable of protecting the electro-optical modulator material. An example of this transfer substrate is a film of plastic material, such as mylar or the like, or a composite, but can also be others.

In one embodiment, overlying the transfer substrate is an intermediary sheet 403, which defines an interface between the transfer substrate 401 and the electro-optical modulator material 405. This sheet has a relatively smooth surface finish to facilitate the transfer process. The sheet also should be durable and capable of temporarily adhering to the electro-optical modulator material 405, but can also easily detach itself from the electro-optical modulator material. An example of the intermediary sheet or film is a metal, such as indium tin oxide, but can also be other materials, e.g., plastics, composites, multi-film structures. In another embodiment, intermediary sheet 403 is not necessary as electro-optical modulator material may be disposed directly upon transfer substrate 401.

Numerous techniques, in fact, too many to mention in this present application, can be used to fabricate the electro-optical modulator material on the transfer substrate according to the present invention. As merely an example, U.S. application Ser. No. 09/098,193, now U.S. Pat. No. 6,151,153, commonly assigned, and hereby incorporated by reference for all purposes, generally describes techniques for fabricating the electro-optical modulator material on the transfer substrate.

The electro-optical modulator material 405 has an upper exposed surface 407. This exposed surface 407 is clean and substantially or completely free from contaminants, e.g., oils, particles. The exposed surface also is relatively planar and smooth. Planarity often ranges from a uniformity value of about 0 microns to about 3 microns across the surface, and is preferably less than about 4 microns RMS, but can also be others. The electro-optical modulator material 405 is often made of liquid crystal containing sheets called Nematic Curvilinear Aligned Phase material, commonly termed NCAP or polymer dispersed liquid crystal (PDLC). Light transmission changes in accordance with a magnitude of an electric field impressed across the liquid crystal material. Alternatively, liquid crystals in a polymer matrix or binder which appear transparent or non-transparent may be used. Alternatively, materials that can be used exploiting the Pockel's effect, in which the magnitude of polarization of reflected light changes depend upon a strength of electric field applied or impressed thereon, may also be used. Of course, the type of electro-element or modulator material used depends upon the application.

In other embodiments, the transfer substrate also includes the intermediary sheet or substrate in a single structure. In these embodiments the combination of the transfer and intermediary sheet(s) or substrate(s) may exhibit the same properties as the transfer substrate and the intermediary sheet individually or the transfer substrate alone. Of course, in other embodiments, additional films and/or layers can be added to facilitate the transfer process of the electro-optical modulator material.

Figure 5:
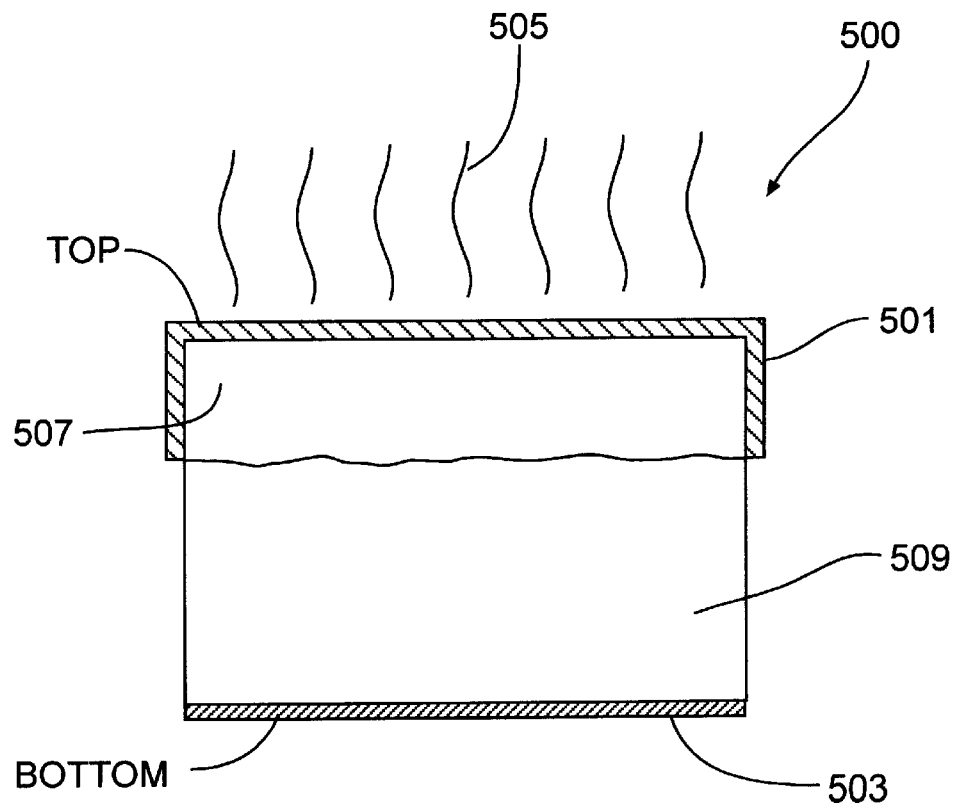

The process also includes providing a substrate or "cube" 500, as shown by FIG. 5. The cube has six sides, which include four non-finished sides and two finished sides, e.g., top and bottom. An example of this cube is made from BK-7 glass from Tusan Optical Research Corporation ("TORC"), but can also be others. Substrate 500 has an overlying electrode layer 501 such as ITO or the like. Electrode layer 501 is defined overlying a top surface of the substrate, as well as portions of the side surfaces or edges 507. Preferably, the indium tin oxide layer is disposed in a single continuous layer overlying the top surface and edges, but it does not cover bottom edges 509 or the bottom of the substrate. The indium tin oxide layer can be applied to the substrate via sputtering and masking techniques, and others.

The indium tin oxide is defined overlying top surfaces and part of the sides of the cube to allow the electric field concentration between the ITO layer and the pixels to be sufficient to change the transmission characteristics of the electro-optical modulator material.

The top surface of the cube is cleaned 505 using solvents to remove contamination such as particles and oils from the top surface. These solvents can include alcohol, acetone, MEK, and others. In some embodiments, a product sold under the trade name of OPTICLEAN™ made by Optical Products, Inc. can be used. This product is dispensed over the top surface as a viscous liquid, which readily absorbs any particles and oils from the top surface. The product then emulsifies into a plastic-like structure similar to "plastic wrap." After emulsification, the structure is pealed off, which also lifts off any oils and particles which embed themselves into the structure, thereby leaving the top surface substantially free from contamination including particles and oils. Of course, the type of cleaning technique may depend upon the application.

Figure 6:
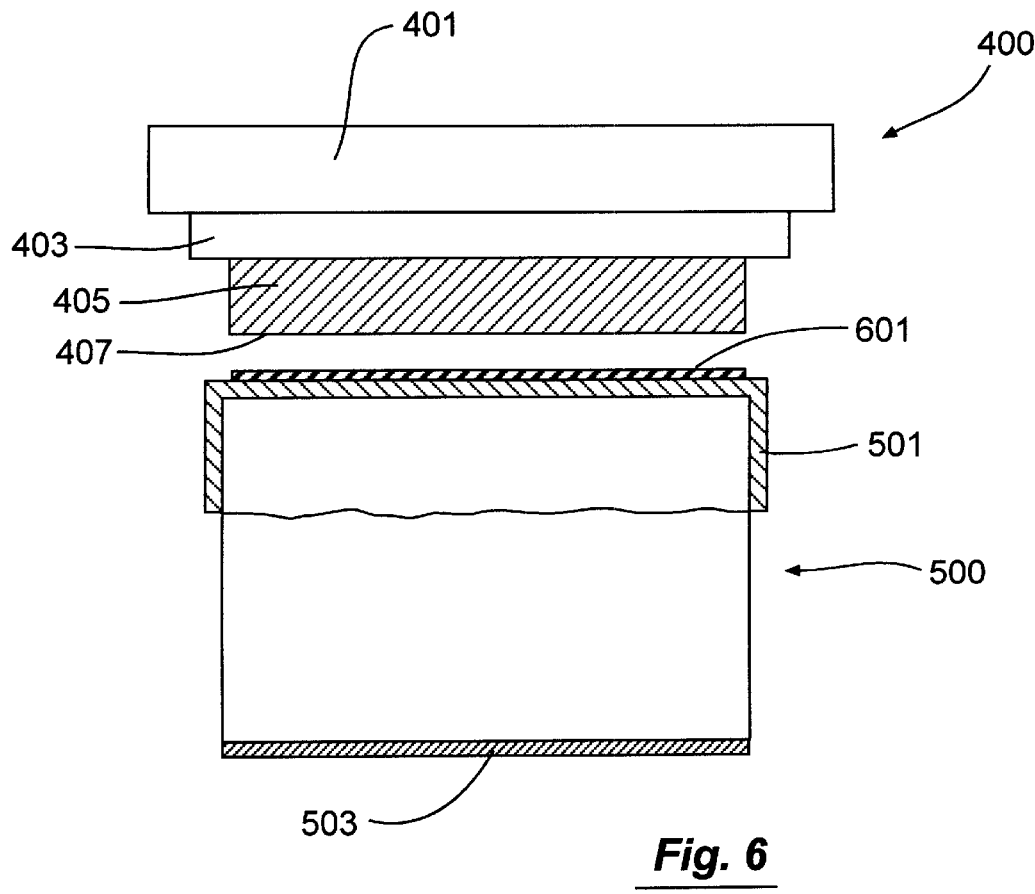

The process undergoes a step of attaching or affixing the electro-optical modulator material 405 onto the cube, as illustrated by FIG. 6. In particular, the top surface 407 of the electro-optical modulator material 405 from the transfer assembly 400 is placed against the surface of the electrode layer 501 defined on the cube 500. Before placing these surfaces against each other, both surfaces are cleaned and/or are substantially free from oils and particulate contamination, as noted above. A layer 601 of adhesive is applied to either one or both of the surfaces before attachment. The adhesive 601 is generally transparent and has desired properties to affix the electro-optical modulator material to the electrode layer. The adhesive is applied uniformly onto one or both of the surfaces. An example of this adhesive is an epoxy, a cyanoacrylate, a silicone based RTV, an ultraviolet light ("UV") curable epoxy. A product sold under the name of UV.10 by Master Bond can be used, but there can be others.

Figure 7:
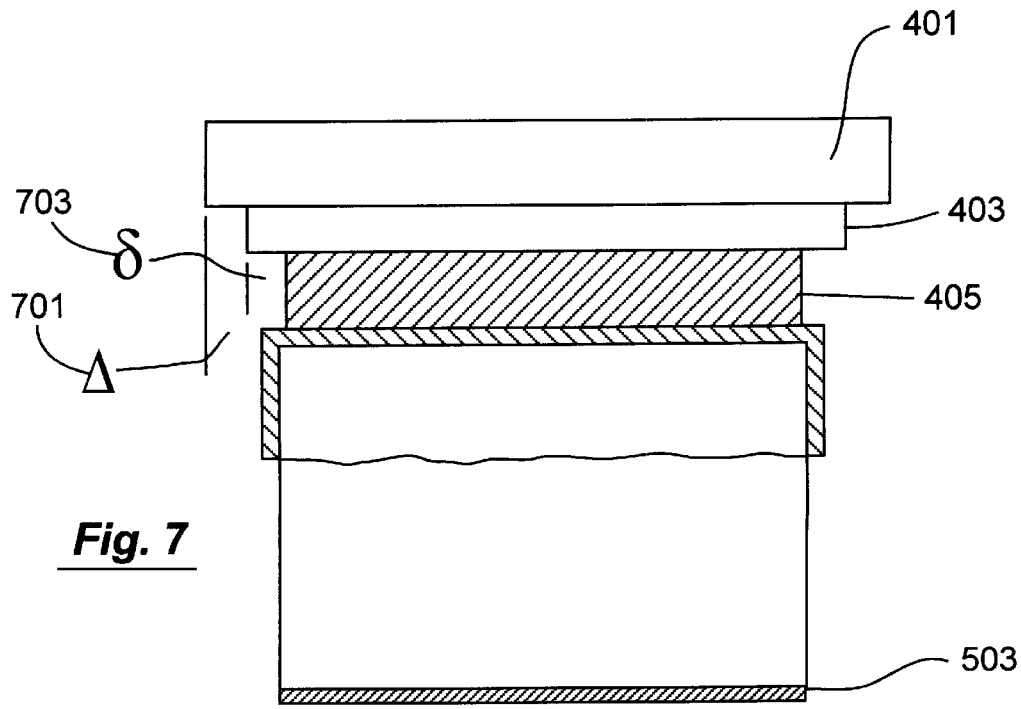

An intermediary structure including the transfer assembly 400 and the cube 500 is illustrated by way of FIG. 7. The electrode layer on the cube is fly affixed to the electro-optical modulator material in the transfer assembly, as shown. The electrode layer on the cube is attached to the electro-optical modulator material at a much greater force (or pressure) than the force (or pressure) attaching the electro-optical modulator material to the transfer substrate. In particular, the force attaching the modulator material to the electrode layer is about or at least greater than the force attaching the modulator material to the transfer substrate, which facilitates the transfer process. Additionally, before placing the transfer assembly onto the cube assembly, the transfer substrate is selectively made to promote or facilitate the transfer process. In particular, the transfer assembly has an overlying transfer substrate region that extends or protrudes at least a distance ("delta") 701 outside the electro-optical modulator material. The intermediary sheet also has a region that extends or protrudes at least a distance ("δ") 703 outside the electro-optical modulator material.

Figure 8:
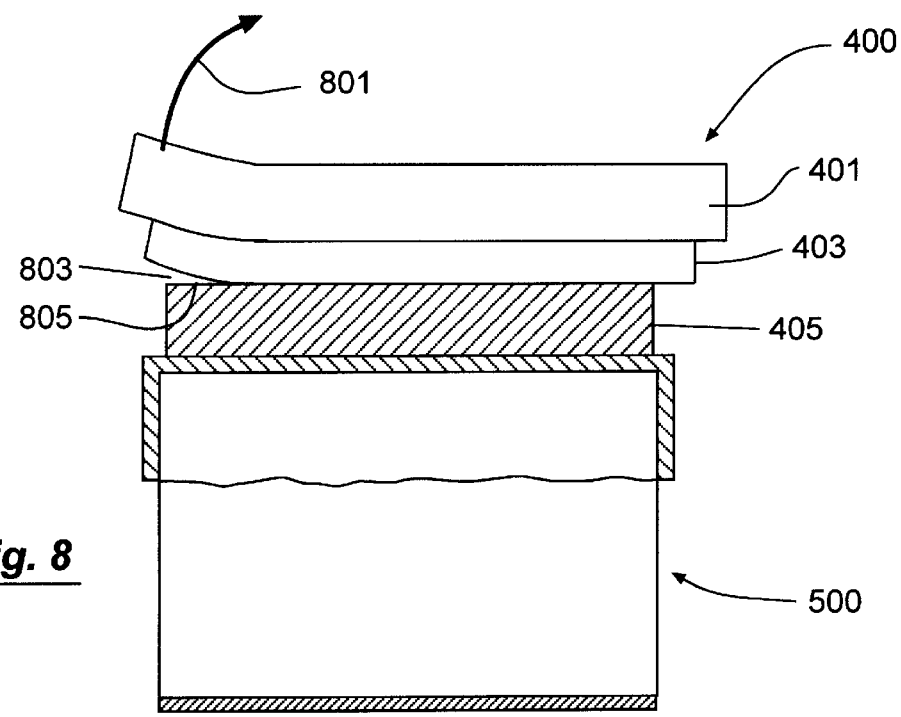

The transfer substrate region extending outside of the electro-optical modulator material can, for example, be mechanically grasped and pulled as shown in FIG. 8. By way of pulling 801 (refer to arrow) the region of the transfer substrate in a direction away from the cube, the transfer substrate is removed or effectively peeled off 803 of the electro-optical modulator material, which removes the transfer substrate off of the electro-optical modulator material. As shown, the electro-optical modulator material remains firmly attached to the electrode layer on the cube and is not damaged by way of the transfer process. The electro-optical modulator material has a surface 805 which is essentially free from defects and is previously protected by the presence of the transfer substrate.

Figure 9:
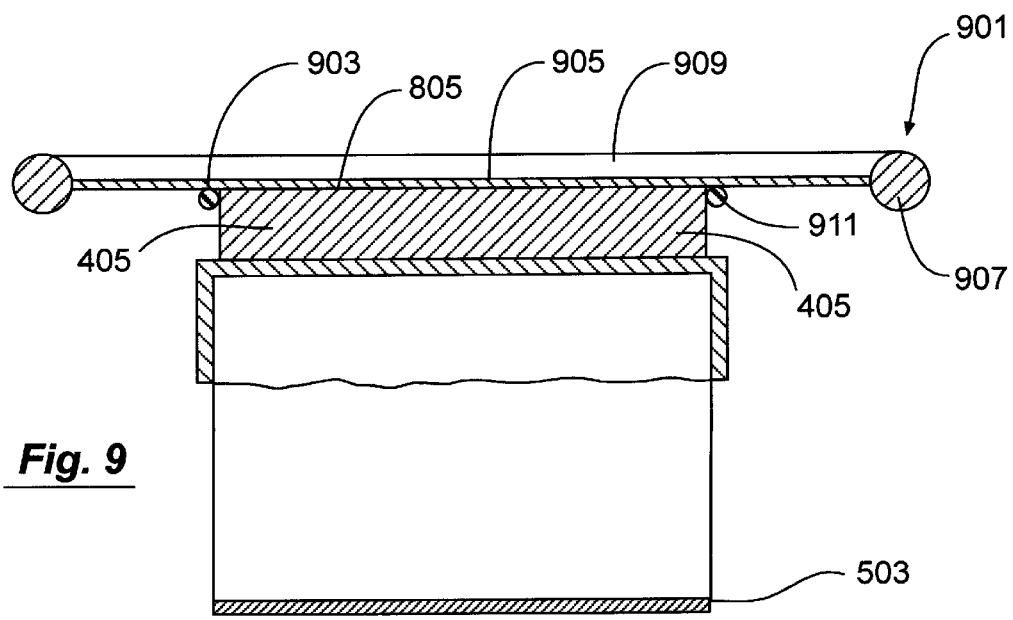

A pellicle assembly 901 is placed overlying surface 805 of the electro-optical modulator material 405, as shown in FIG. 9. Preferably, the pellicle assembly is applied to the electro-optical modulator material immediately after removing the transfer substrate to prevent a possibility of contaminants (e.g., oils, particles) from accumulating or attaching themselves on the exposed modulator material. The pellicle assembly 901 has an reflective layer 903 disposed on an inner surface 905 against surface 805 of the electro-optical modulator material 405. A rigid support structure 907 holds a sheet 909, which supports electrode layer 904. The sheet 909 is often made of a material as thin as possible, usually less than 3.0 microns thick with a dielectric mirror (reflective layer 903). Support structure 907 can be an annular ring assembly to provide a frame like structure to hold sheet 909.

In preferred embodiments, the pellicle assembly 901 is fabricated separately and is affixed to the electro-optical modulator material 405 using an adhesive. In most cases, an adhesive bonds surface 805 of the electro-optical modulator material 405 to a surface of the mirror layer 903. Adhesive can be applied to either or both surfaces. In some embodiments, the adhesive can also be applied to an outside interface of the modulator material on the electrode in a bead-like 911 manner to seal the outer edges of the modulator/electrode assembly. The adhesive is generally transparent when dried and is capable of bonding a metal to the electro-optical modulator material. An example of this adhesive is an epoxy, a cyanoacrylate, a silicone based RTV, an ultraviolet light ("UV") curable epoxy. A product sold under the name of UV. 10 by Master Bond can be used, but there can be others.

FIGS. 10–15 are simplified cross-sectional view diagrams of an electro-optical element being manufactured according to yet an alternative embodiment of the present invention. These diagrams are merely illustrations and should not limit the scope of the claims herein. One of ordinary skill in the art would recognize other variations, modifications, and alternatives.

Figure 10:
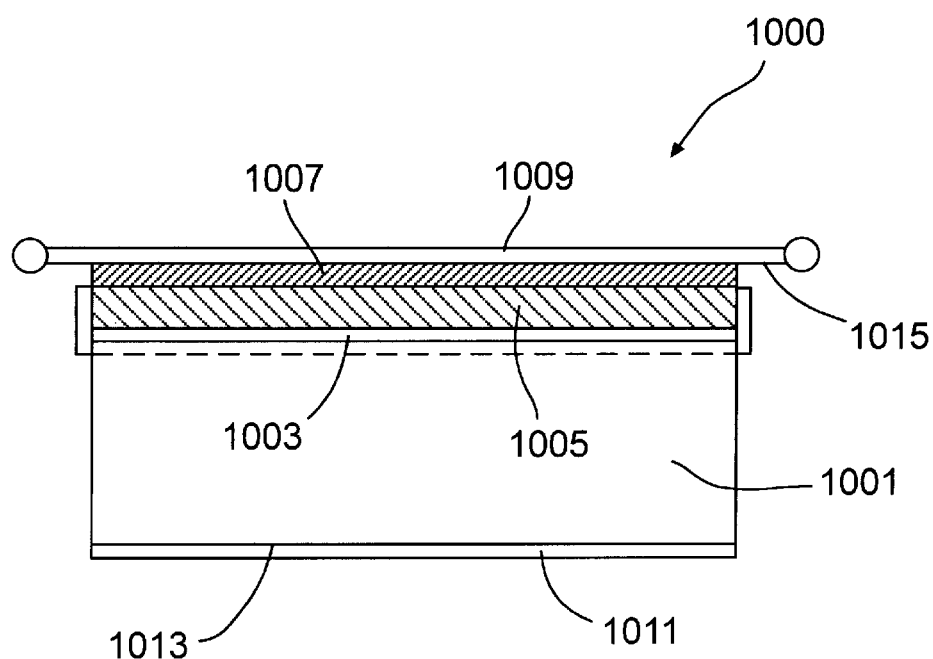
FIGS. 10–15 are simplified cross-sectional view diagrams of an electro-optical element being manufactured according to yet an alternative embodiment of the present invention.

In FIG. 10, electro-optical element 1000 includes a variety of layers in a novel configuration. Electro-optical modulator material 1007 is sandwiched between an electrode and a pellicle assembly 1009. Glass substrate, which is coated with a conductive material, overlies a surface of support substrate 1001, which is often termed a cube. Glass substrate attaches to or is affixed to cube 1001 by way of glue layer 1003. Silver paint or conductive material is applied to edges of the glass substrate or conductive material on the glass substrate. Substrate 1001 includes an anti-reflective coating 1011 defined overlying a bottom surface 1013. Pellicle assembly 1009 also includes a reflective layer 1015.

The electro-optical modulator material is often made of liquid crystal containing sheets called Nematic Curvilinear Aligned Phase material, commonly termed NCAP or polymer dispersed liquid crystal (PDLC). Light transmission changes in accordance with a magnitude of an electric field impressed across the liquid crystal material. Alternatively, liquid crystals in a polymer matrix or binder which appear transparent or non-transparent may be used. Alternatively, materials that can be used exploiting the Pockel's effect, in which the magnitude of polarization of reflected light changes depend upon a strength of electric field applied or impressed thereon, may also be used. Of course, the type of electro-element or modulator material used depends upon the application. Electro-optical material is defined on the glass substrate, which is coated with conductive material to form the electrode. In preferred embodiments, the electro-optical material and electrode assembly are made as a single unit for easy in assembly or manufacturing. Details of manufacturing the assembly is provided below.

The present electro-optical element includes the glue layer 1003, which is sandwiched between the glass substrate and the cube, that is thinner and more planar than pre-existing structures. In particular, the glue layer between the glass substrate and the cube is preferably a thin film of adhesive. Specifically, the adhesive layer should be flatter than 3 microns across the entire surface. Further the adhesive should have a thickness of less than about 0.5 microns to 1.0 microns. An example of this adhesive is an epoxy, a cyanoacrylate, a silicone based RTV, an ultraviolet light ("UV") curable epoxy. A product sold under the name of UV.10 by Master Bond can be used, but there can be others.

The pellicle assembly 1009 is generally made of a support structure having a film of plastic disposed thereon. The support structure can be an annular ring structure such as an aluminum ring or the like. The plastic film can be made of a variety of materials, but is preferably mylar. The plastic film often includes an overlying reflective layer 1015. Preferably, the reflective layer is defined overlying a surface, which faces against the electro-optical modulator material. This reflective layer facing the electro-optical modulator material is protected by the overlying film of plastic such as mylar and the like. A thin film or bead of adhesive can be applied to a periphery of the electro-optical material to seal it to reflective layer. Accordingly, the present pellicle assembly is more durable than those made by pre-existing techniques.

Figure 11:
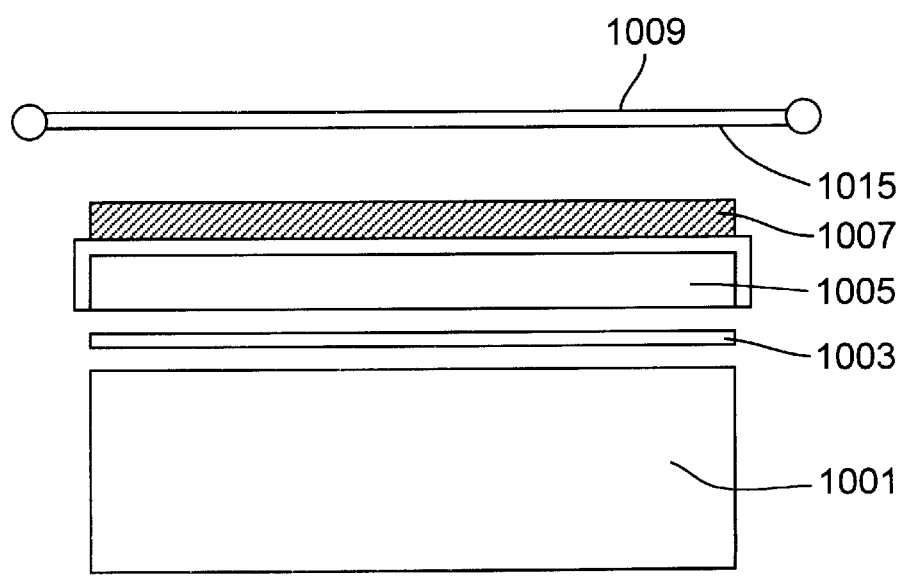
Figure 12:
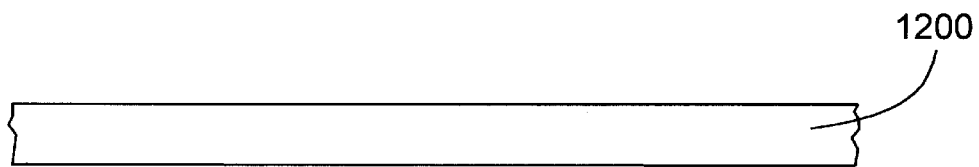

FIG. 11 is a simplified diagram of an unassembled electro-optical element according to the present invention. FIG. 11 uses the same reference numerals as the FIG. 10 above for easy reading. The unassembled element includes a variety of features such as the cube 1001, the glue layer 1003, and the pellicle assembly 1009. The element also includes, as a single unit in preferred embodiments, the electro-optical modulator material 1007, which is defined on the glass substrate 1005. The modulator material 1007 is affixed to the top surface of the glass substrate, which is coated with transparent electrode material such as indium tin oxide or the like. Electrode material is also continuously disposed on edges 1101 of the glass substrate to provide a single continuous conductive region. The electrode material on the edges provides a contact site for an electrical connection to the electrode material facing the electro-optical modulator material.

In a specific embodiment, the invention provides a technique for manufacturing an electro-optical modulator material on an electrode as a single unit. The technique may be briefly outlined as follows:

1. Provide a substrate having a top surface and edges;
2. Form a conductive or electrode layer overlying the top surface and the edges of the substrate;
3. Form an electro-optical modulator material on the top surface of the substrate to form a modulator electrode assembly;
4. Separate the assembly into a plurality of modulator electrode assemblies;
5. Assemble one of the separated assemblies onto a cube and pellicle; and
6. Perform remaining fabrication steps, as necessary.

As shown, the technique generally provides a sequence of steps that forms an electro-optical modulator material on a substrate. The sequence of steps uses as a single assembly an electro-optical modulator material formed on an electrode. By way of this assembly, the electro-optical material including one of the electrodes is easily affixed to a substrate and pellicle to form the electro-optical assembly. The above sequence of steps is merely illustrative, and should not limit the scope of the claims herein. One of ordinary skill in the art would recognize other variations, modifications, and alternatives. Details with regard to the present invention are described throughout the present specification and more particularly in the Figs. below.

FIGS. 12–15 are simplified cross-sectional view diagrams of an electro-optical element being manufactured according to the present invention. These diagrams are merely illustrations and should not limit the scope of the claims herein. The present process begins by providing substrate 1200, which will be used as the base for the electrode. The substrate can be any suitable material which is substantially transparent and provides relatively flat surfaces for the formation of an electrode. The substrate should also be suitably rigid to provide support to the electro-optical modulator material to be formed on the substrate. The substrate also has a desired length and a width for the manufacture of electro-optical elements. The substrate also includes substantially vertical edges that meet at the top surface at a 90 degree angle, but can be others.

Figure 13:
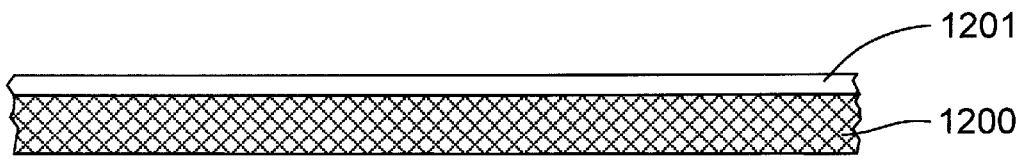

A conductive layer 1201 is formed overlying the top surface of the substrate and the sides, as illustrated by FIG. 13, for example. The conductive layer is preferably a transparent conductive film such as indium tin oxide, but can also be an other film of suitable characteristic. The film can be applied using any conventional techniques such as sputtering, chemical vapor deposition, and others. In a specific embodiment, indium tin oxide is sputtered to form a continuous film of conductive material overlying the top surface and sides of the substrate.

Figure 14:
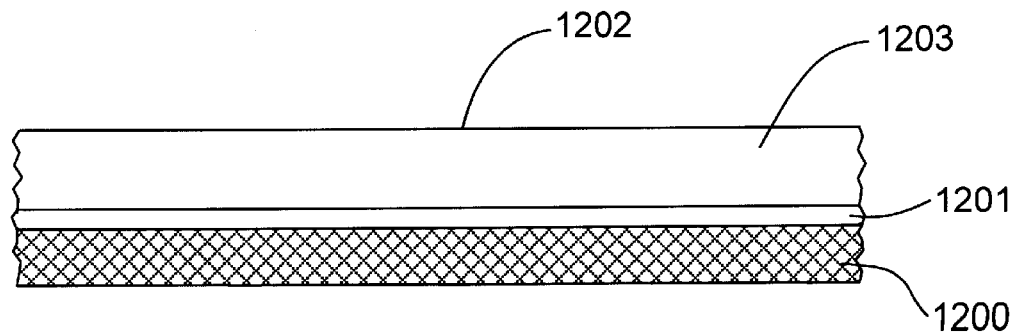

Modulator material 1203 forms overlying the top surface of the substrate, as shown in FIG. 14. The electro-optical modulator material 1203 is often made of liquid crystal containing sheets called Nematic Curvilinear Aligned Phase material, commonly termed NCAP or polymer dispersed liquid crystal (PDLC). Light transmission changes in accordance with a magnitude of an electric field impressed across the liquid crystal material. Alternatively, liquid crystals in a polymer matrix or binder which appear transparent or non-transparent may be used. Alternatively, materials that can be used exploiting the Pockel's effect, in which the magnitude of polarization of reflected light changes depend upon a strength of electric field applied or impressed thereon, may also be used. Of course, the type of electro-element or modulator material used depends upon the application.

Figure 15:
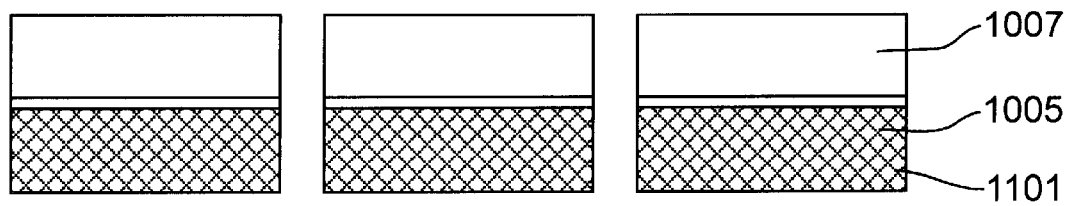

In order to manufacture specific electro-optical elements, the modulator material and substrate are separated into a plurality of elements. FIG. 15 shows a simplified diagram of a plurality of electro-optical elements that are separated from the structure of the above FIG. 14. In a specific embodiment, each of the elements can be separated from each other by a cutting technique. The cutting technique can be any suitable technique for cutting diagonally into the structure of the above Fig. In an alternative embodiment, each of the elements can be separated from each other by a scribing and breaking technique. That is, a diamond scribe is used to place a scribe at a desired location of the modulator structure. Mechanical force is placed on each side of the scribe to break the modulator structure in half. This scribe and break technique can be performed repeatedly to remove a modulator structure of desired size and shape. This modulator structure including the electrode is used to assemble a modulator element such as the one illustrated by FIGS. 10 and 11. Of course, this modulator element can also be used in other modulator elements.

Figure 16:
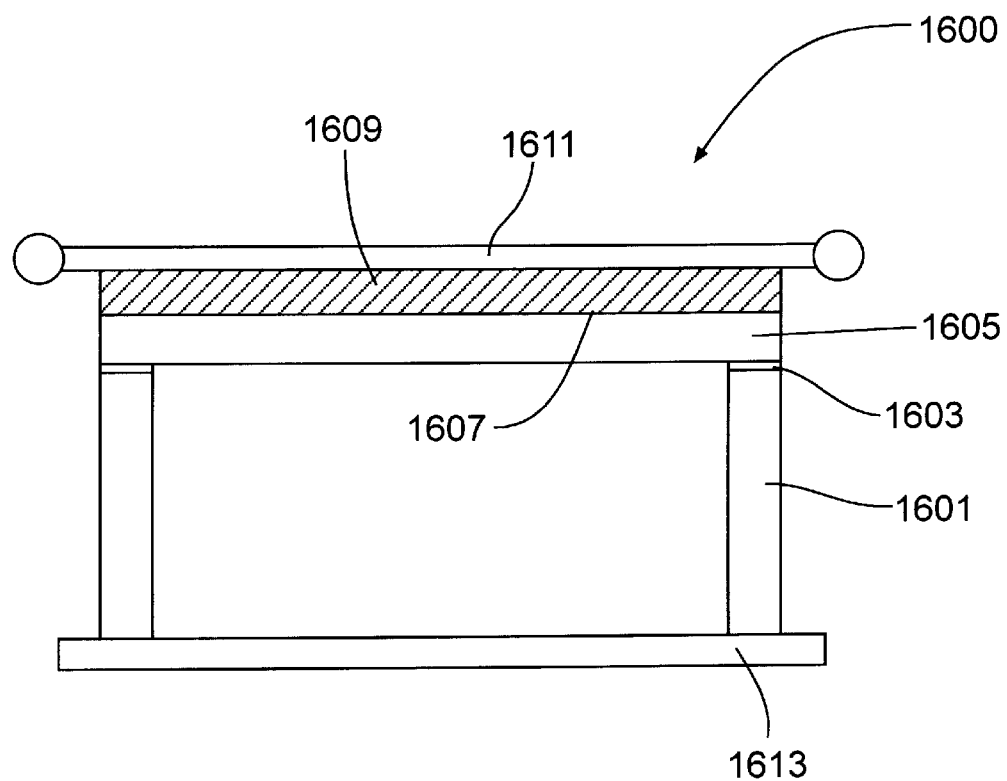
FIGS. 16–17 are simplified diagrams of an electro-optical element according to still a further embodiment of the present invention.

FIG. 16 is a simplified diagram of still a further embodiment of an electro-optical element 1600 according to the present invention. This diagram is merely and illustration and should not limit the scope of the claims herein. One of ordinary skill in the art would recognize other modifications, alternatives, and variations. The element 1600 includes a variety of features such as those noted herein. For example, this element includes a pellicle assembly 1611, which has an dielectric mirror disposed thereon. The element 1600 also includes an electro-optical modulator material 1609. The modulator material is sandwiched between the pellicle assembly and a glass substrate 1605. The glass substrate has an electrode layer disposed thereon. Glass substrate is disposed on a frame structure 1601, rather than the cube, as shown above. Glass substrate is affixed to the frame by way of adhesive 1603 or the like. The frame structure forms on a base plate 1613, but does not require a base plate in some applications.

Figure 17:
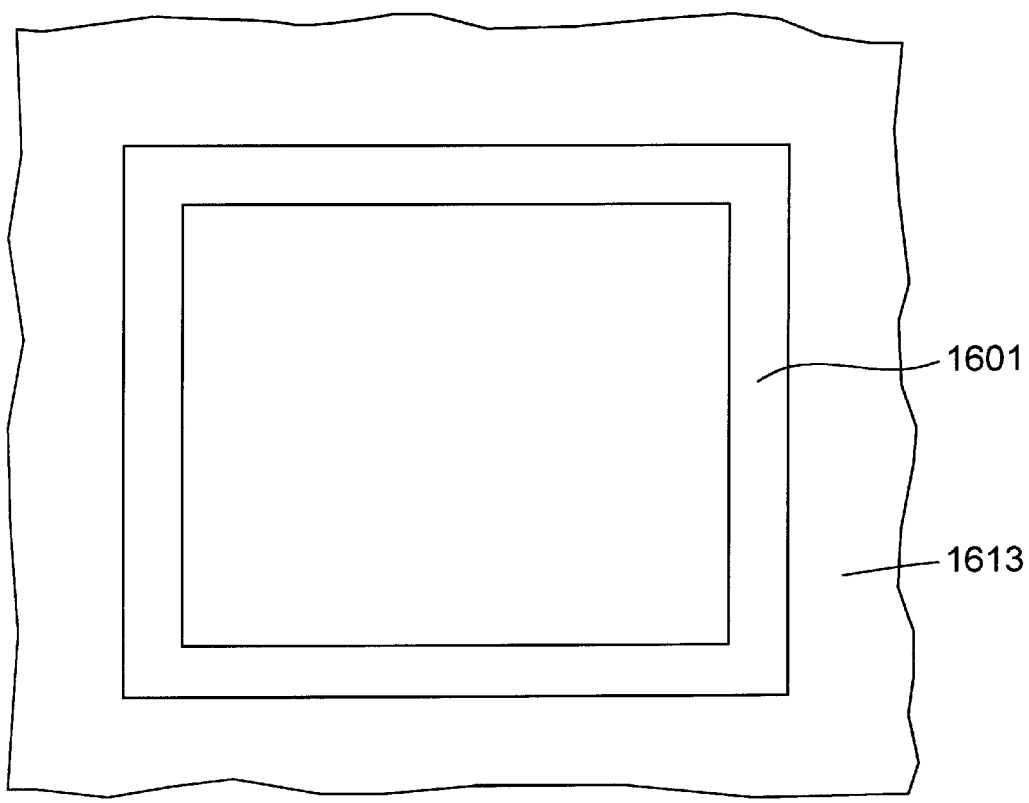

FIG. 17 is a simplified top-view diagram of the frame structure of the above Fig. The top-view diagram includes the frame 1601, which is square or rectangular in shape with an opening therein. The frame is defined on the base plate 1613. In most embodiments, the frame is made of a suitable material that is rigid and has a planar top surface to support the glass substrate. The frame can be made of a variety of materials such as a metal, an insulator, or a plastic material. The metal can be aluminum or the like. The insulator can be a glass or plastic material. The plastic material can include, among others, a plastic resin and an epoxy. In certain embodiments, the frame can be made by way of injection molding or other high capacity processes. The frame can also have ribs for support and can be made in a variety of other shapes and sizes, depending upon the application.

Although the above descriptions are described in terms of a specific embodiment, other variations, alternatives, and modifications can be used. For instance, although the electrode layer in the above embodiment is described as indium tin oxide, and the like. Additionally, the substrate described is one manufactured by TORC, other substrates supplied by other vendors can also be used. The above electro-optical element can be used in a variety of applications including, for example, the test equipment shown in the FIG. 2 above.

Although the above embodiments are described in terms of using a transfer substrate having an exposed electro-optical modulator material defined thereon, the modulator material may also have a temporary film or sheet of material defined on the modulator material for storage and/or protection. In particular, a film or sheet of material can be placed overlying the modulator material to define a sandwiched structure, including the modulator material disposed between two films of material, which include the transfer substrate. One sheet or film of material is attached to the modulator material at a greater strength than the other sheet or film of material, which allows for one sheet to be removed leaving the other film substantially intact. Preferably, removal of the one sheet occurs immediately before placing the modulator material onto the electrode layer to prevent a possibility of any contamination from accumulating on the modulator material. As previously noted, U.S. application Ser. No. 09/098,193, now U.S. Pat. No. 6,151,153, (Attorney Docket No. 14116-57), commonly assigned, describes this process.

The invention has now been explained with reference to specific embodiments. Other embodiments will be apparent to those of ordinary skill in the art in light of the disclosure. For example, general techniques for transferring an electro-optical modulator have been described. The invention can also be applied to the application of any type of electro-optical modulator medium to an electrode layer. It is therefore not intended that this invention be limited, except as indicated by the appended claims.

What is claimed is:

1. A method for fabricating an electro-optical modulator material, said method comprising:

providing a substrate comprising a top surface having a first layer of electrode material thereon, wherein a surface area of said first layer of electrode material is generally equal to a surface area of said top surface;

applying a transfer sheet comprising an electro-optical material to said first layer of electrode material, said electro-optical material being affixed to said first layer of electrode material; and removing said transfer sheet from said electro-optical material, whereupon said removing step leaves a substantial portion of said electro-optical material substantially affixed to and substantially intact on said first layer of electrode material.

2. The method of claim 1 wherein said electro-optical material is selected from PDLC and NCAP.

3. The method of claim 1 wherein said step of applying uses an adhesive that is substantially transparent optically.

4. The method of claim 1 further comprising a step of cleaning said layer of electrode material before said applying step.

5. The method of claim 4 wherein said cleaning step uses a solvent.

6. The method of claim 5 wherein said solvent is selected from alcohol, acetone, and MEK.

7. The method of claim 4 wherein said cleaning step substantially removes particulate contamination or oils from said layer of electrode material.

8. The method of claim 1 wherein said electro-optical material is affixed to said first layer of electrode material using an adhesive selected from an epoxy, a cyanoacrylate, RTV, a UV curable epoxy.

9. The method of claim 1 further comprising a step of disposing a pellicle on said electro-optical material.

10. The method of claim 9 wherein said pellicle comprises a mylar sheet having a dielectric mirror.

11. The method of claim 10 wherein said dielectric mirror is adjacent to said first layer of electrode material.

12. The method of claim 10 wherein said mylar sheet is adjacent to said first layer of electrode material.

13. The method of claim 10 wherein said dielectric mirror is formed by evaporatively depositing an oxide from a class of oxides comprising zirconium oxide, aluminum oxide and chromium oxide.

14. The method of claim 1 wherein said substrate comprises a bottom surface comprising a layer of anti-reflective coating thereon.

15. The method of claim 14 wherein said substrate is a cube.

16. The method of claim 14 wherein said substrate is a cube comprising a layer of electrode material thereon.

17. The method of claim 16 wherein said layer of electrode material overlies a top surface and portions of sides of said cube.

18. The method of claim 1 wherein said transfer sheet comprises a layer of indium tin oxide thereon.

19. The method of claim 1 wherein said transfer sheet has a larger surface area than said electro-optical material such that a region of said transfer sheet protrudes outside an edge of said electro-optical material.

20. The method of claim 1 wherein said transfer sheet comprises a film selected from mylar, plastic, and metal.

21. The method of claim 1 wherein said transfer sheet comprises a mylar film overlying a layer of indium tin oxide thereon.

22. The method of claim 1 wherein said transfer sheet comprising said electro-optical material is formed using steps comprising providing a sandwiched structure comprising an electro-optical material sandwiched between a first transfer sheet and a second transfer sheet; and removing one of said transfer sheets to expose a surface of said electro-optical material.

23. The method of claim 22 wherein at least one of said transfer sheets comprises a layer of indium tin oxide.

24. The method of claim 22 wherein at least one of said transfer sheets comprises a layer of mylar overlying indium tin oxide.

25. The method of claim 22 wherein at least one of said transfer sheets is attached to said electro-optical material at a greater strength than said other transfer sheet.

26. The method of claim 25 wherein said greater strength is a relative force of about two times and greater.

27. The method of claim 25 wherein said greater strength is a relative force of about five times and greater.

28. The method of claim 25 wherein said greater strength is a relative force of about ten times and greater.

29. The method of claim 25 wherein said greater strength is a relative force of about twenty times and greater.

30. The method of claim 25 wherein said transfer sheet having said greater strength remains substantially attached to said electro-optical material after said removing step.

31. An electro-optical element, said electro-optical element comprising:

a substrate comprising an upper surface;

an electrode material on said upper surface, wherein said electrode material overlies portions of edges of said substrate;

an electro-optical modulator material defined on said electrode material; and a sheet overlying said electro-optical modulator material to provide protection from a possibility of mechanical damage to said electro-optical modulator material.

32. The electro-optical element of claim 31 wherein said sheet comprises a relatively rigid plastic film.

33. The electro-optical element of claim 31 wherein said sheet is a mylar film.

34. The electro-optical element of claim 31 wherein said sheet is affixed to a rigid structure.

35. The electro-optical element of claim 34 wherein said rigid structure is an annular ring structure.

36. The electro-optical element of claim 35 wherein said annular ring structure is made of aluminum.

37. The electro-optical element of claim 31 wherein said substrate comprises a lower surface comprising an anti-reflective layer thereon.

38. The electro-optical element of claim 31 wherein said electro-optical modulator material is selected from PDLC and NCAP.

39. The electro-optical element of claim 31 wherein said sheet comprises a dielectric mirror layer and a rigid layer.

40. The electro-optical element of claim 39 wherein the dielectric mirror layer is adjacent the electro-optical modulator material.

41. The electro-optical element of claim 39 wherein the dielectric mirror layer is coupled to said electro-optical modulator material using an adhesive, said adhesive comprising a bead of adhesive sealing an interface between said second electrode and said electro-optical modulator material.

42. The electro-optical element of claim 39 wherein the rigid layer is disposed between the dielectric mirror layer and the electro-optical modulator material.

43. An electro-optical element comprising:

a substrate having a top surface and edges;

an electrode material disposed on said substrate and substantially covering said top surface and at least a portion of said edges; and a modulator material disposed on said electrode material;

wherein said substrate, said electrode material, and said modulator material are separated to provide a plurality of electro-optical elements.

44. The element of claim 43 wherein said substrate is a glass substrate.

45. The element of claim 43 wherein said substrate comprises substantially vertical edges.

46. The element of claim 43 wherein said electrode material comprises indium tin oxide.

47. The element of claim 43 wherein each of said plurality of electro-optical elements is separated using a step of scribing and breaking.

48. A method of forming an electro-optical element, said method comprising:

providing a substrate having a top surface and edges;

forming an electrode material on said substrate to substantially cover said top surface and at least a portion of said edges;

forming a modulator material on said electrode material to form a sandwiched structure comprising said substrate, said electrode material, and said modulator material;

separating an electro-optical element comprising a portion of said substrate, a portion of said electrode material, and a portion of said modulator material from said sandwiched structure.

49. The method of claim 48 wherein said separating step comprises scribing and breaking steps.

50. The method of claim 48 wherein said portion of said modulator material overlies said portion of said electrode material and said portion of said electrode material overlies said portion of said substrate.

51. The method of claim 48 wherein said substrate is a frame structure.

52. A method for fabricating an electro-optical modulator material, said method comprising:

providing a substrate comprising a top surface and a side, the substrate having a first layer of electrode material thereon, said first layer of electrode material covering a portion of said top surface and a portion of said side;

applying a transfer sheet comprising an electro-optical material to said first layer of electrode material, said electro-optical material being affixed to said first layer of electrode material; and removing said transfer sheet from said electro-optical material, whereupon said removing step leaves a substantial portion of said electro-optical material substantially affixed to and substantially intact on said first layer of electrode material.

* * * * *